United States Patent [19]

Pardy

[11] Patent Number: 4,871,432
[45] Date of Patent: Oct. 3, 1989

[54] RECOVERY PROCESS

[75] Inventor: Richard B. A. Pardy, Cherry Burton, Nr. Beverley, England

[73] Assignee: BP Chemicals Limited, London, England

[21] Appl. No.: 52,052

[22] Filed: May 21, 1987

[30] Foreign Application Priority Data

May 30, 1986 [GB] United Kingdom ............... 8613221

[51] Int. Cl.$^4$ .............................................. B01D 13/02
[52] U.S. Cl. ................................. 204/182.4; 204/151
[58] Field of Search ................ 204/182.4, 182.5, 130, 204/131, 149, 151, 182.3, 301

[56] References Cited

U.S. PATENT DOCUMENTS

| 3,645,891 | 2/1972 | Goldup et al. | 210/653 |
| 4,146,455 | 3/1979 | McRae | 204/182.6 |
| 4,227,981 | 10/1980 | Williams et al. | 204/182.6 |
| 4,414,401 | 11/1983 | Wintermeyer et al. | 549/370 |
| 4,680,098 | 7/1987 | Chang | 204/182.4 |

FOREIGN PATENT DOCUMENTS

81/01417 10/1981 PCT Int'l Appl.
1266180 of 1972 United Kingdom.

OTHER PUBLICATIONS

"A Study of the Ionic Composition of Alcohol Solutions of Rhodium Complexes by Electrodialysis"-English Language Translation of the Russian Reference, Separation and Recovery of Noble Metals, Chemical Abstracts, vol. 94, 1982.

Primary Examiner—John F. Niebling
Assistant Examiner—John S. Starsiak, Jr.
Attorney, Agent, or Firm—Nixon & Vanderhye

[57] ABSTRACT

A process for recovering a Group VIII noble metal catalyst, e.g. rhodium, from a liquid medium comprising Group VIII metal and a tar formed as a by-product in a carbonylation process is provided. The process comprises feeding the liquid medium to a first compartment of an electrodialysis cell and feeding a solvent to a second compartment adjacent the first. A voltage is applied to the electrodialysis cell to effect migration of the Group VIII metal from the first compartment to the second. The solvent used is preferably aqueous acetic acid.

12 Claims, 3 Drawing Sheets

RECOVERY PROCESS

BACKGROUND OF THE INVENTION

The present invention relates to a process for recovering metals from tar. In particular, the present invention relates to a process for recovering Group VIII noble metals, which have been used as catalysts in carbonylation processes, from tar produced as byproducts in such processes.

The use of Group VIII noble metals to catalyse a range of carbonylation processes is now well established. In particular liquid phase homogenous carbonylation processes using rhodium catalysts have been shown to be capable of commercial exploitation. Typical examples of such processes include the carbonylation of methanol to form acetic acid, the hydroformylation of olefins to produce high molecular weight aldehydes and alcohols and the carbonylation of methyl acetate to produce acetic anhydride or ethylidene diacetate.

A potential problem, however, exists in the use of such Group VIII noble metals as catalysts on a commerical scale, namely the possibility of catalyst loss. It is extremely desirable to minimise losses if possible because Group VIII noble metals are extremely expensive and significant losses can easily make the operation of commercial plants uneconomic.

One potential source of catalyst loss is in any tars which are produced as a side product during the carbonylation reaction. For example in the rhodium catalysed carbonylation of methyl acetate to acetic anhydride, it is known that tars are produced in considerable quantities and that such tars tend to absorb the rhodium catalyst and any associated catalyst promoters and copromoters thereby depleting the reaction mixture of valuable active catalyst. In such cases it is necessary to include as part of the total process, a processing step which not only removes the tar from the reaction mixture, but also frees the catalyst components from the tar and converts them into a form suitable for recycling.

A tar removal/catalyst recovery process of the type contemplated above has been disclosed in PCT International application 82/01829. This process, for use with the lithium promoted, rhodium catalysed carbonylation of methyl acetate to acetic anhydride, comprises; removing by distillation, any volatile material from a process stream containing tar catalyst and promoter; mixing the tar/catalyst/promoter mixture with methyl iodide and finally contacting the tar/methyl iodide/catalyst/promoter mixture with aqueous hydrogen iodide under conditions which effect the extraction of the catalyst and promoter into the aqueous hydrogen iodide. Since the methyl iodide/tar mixture and the aqueous hydrogen iodide are immiscible they can easily be separated after the extraction. Once the separation is complete the rhodium catalyst and lithium promoter can be recovered from the aqueous hydrogen iodide. The methyl iodide/tar mixture is fed after the separation to a distillation unit where the methyl iodide is removed overhead and recycled whilst the tar is removed at the bottom and burnt.

An alternative process has now been discovered which is applicable to the recovery of any Group VIII noble metal catalyst from a tar. The process involves electrodialysing the Group VIII noble metal catalyst from a liquid medium containing the tar directly into a stream comprising a solvent.

SUMMARY OF THE INVENTION

Accordingly, the present invention provides a process for recovering a Group VIII noble metal catalyst from a liquid medium comprising the Group VIII noble metal catalyst and tar, the tar having been formed as a by-product during a carbonylation reaction, which process comprises feeding the liquid medium to a first compartment of an electrodialysis cell and feeding a solvent to a compartment adjacent the first, the electrodialysis cell being operated to effect the migration of the Group VIII metal catalyst from the first compartment to the second compartment.

The Group VIII noble metal which can be recovered from the tar can be any one or more of the metals ruthenium, osmium, rhodium, iridium, palladium or platinum. Preferably the process is employed to recover either rhodium or iridium and most preferably to recover rhodium.

In addition to the Group VIII noble metal the process can also be used to recover simultaneously any associated promoters or copromoters which may be present in the tar. The promoters used in such carbonylation processes are typically halogen promoters preferably bromine or iodine promoters. Such promoters can be recovered by the process of the invention providing that the halogen promoter is in an ionic form in the tar-containing liquid medium or is at some point converted into such a form. Halogen promoters are most suitably recovered as halide ion e.g. iodide or bromide or as a halide complex of the Group VIII metal e.g. $Rh(CO)_2I_2^-$.

Copromoters, like promoters, can also be recovered by this process providing they are also in an ionic form or can be recovered in such a form. For example, copromoters such as amines, phosphines, arsines and stibines can be recovered if they are present in the tar-containing liquid medium in a cationic quaternised form. Of these copromoters it is preferred to recover quaternised amines or phosphine and in particular the quaternised forms of tertiary amines or heterocyclic aromatic amines such as pyridines, imidazoles, quinolines and the like which are typically used in carbonylation processes.

Other promoters which can be used include metal copromoters such as the members of Group IA, IIA, IIIA, IVB, VB, VIB, VIIB Groups of the Periodic Table together with non-noble Group VIII metals. Typical examples of such metal copromoters include lithium, chromium, vanadium, iron, cobalt, nickel, aluminium, magnesium and calcium.

The tar can in principle arise from any Group VIII noble metal catalysed carbonylation process but it is preferably one which arises from (a) the rhodium catalysed carbonylation of methanol to produce acetic acid, or (b) the rhodium catalysed carbonylation of methyl acetate to produce acetic anhydride or (c) the rhodium catalysed carbonylation of methyl acetate in the presence of hydrogen to produce ethylidene diacetate.

The solvent into which the Group VIII metal and any associated promoters and copromoters are extracted is suitably one which is immiscible with the tar. It is also preferably one which does not degrade the membranes which are present in the electrodialysis cell and is one in which the catalyst, promoters and copromoters are highly soluble. Suitable examples of solvents include water, aqueous lower carboxylic acids, e.g. formic, acetic or propionic acid, methanol and acetonitrile. The exact choice of solvent will often be determined by the carbonylation process which generates the tar. Thus in a carbonylation process producing acetic acid as a product it is preferable to use aqueous acetic acid as the solvent since, after the process of the invention has taken place, the aqueous acetic acid/-Group VIII metal catalyst/promoter/copromoter mixture can be recycled direct to the carbonylation process without further processing. The aqueous acetic acid is suitably one having a molar ratio of water to acetic acid in the range 100:1 to 1:20 preferably 3:1 to 1:2.

BRIEF DESCRIPTION OF THE DRAWINGS

The invention will now be described with reference to the accompanying drawings, in which.

DETAILED DESCRIPTION OF THE INVENTION

Figure 1:
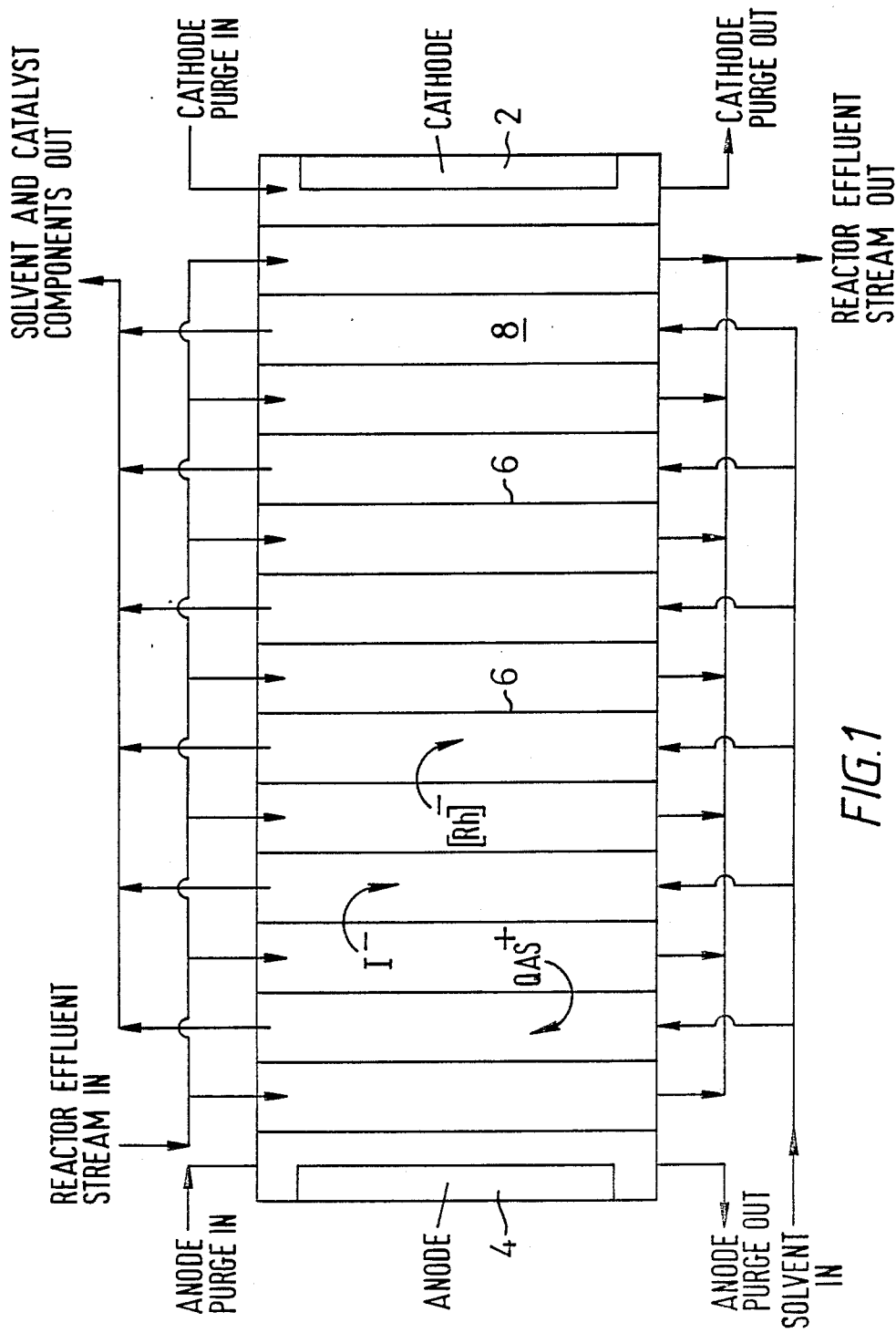
FIG. 1 is an electrodialysis cell which can be used in the process of the present invention.

Electrodialysis cells which are useful in this process are described in general terms in "Industrial Electrochemistry" by D. Pletcher. An example of an electrodialysis cell which can be used is shown in FIG. 1. The cell comprises one or more cathodes (2) and one or more anodes (2), which are spaced apart, the intervening space being divided by a plurality of ion-selective membranes (6) into a number of compartments (8). The number of such compartments used depends upon the degree of recovery that is required by the process since the greater the number of compartments the better the recovery. Each compartment has an inlet and outlet which allows either the liquid medium or the solvent to pass through it. The compartments are arranged so that the liquid medium and solvent pass through alternate compartments. It is preferable to purge the anode and cathode compartments to prevent electrolysis of the feed dialysate and to recover methyl iodide which may have diffused through the membranes. The ion selective membranes are arranged so that starting at the membrane nearest the anode and moving towards the cathode, the membrane alternate between being cation permeable and anion permeable until the cathode is reached. For many carbonylation reactions, a very convenient purging electrolyte for the electrode compartments is a water-acetic acid mixture, since this is conducting and can then be added to the solvent stream after separation from electrolytically evolved gases. In some cases, it may be necessary to pass the electrode purge through compartments adjoining the electrode compartments to prevent further diffusion of methyl iodide or other iodide species to the anode compartment in particular.

If it is contemplated that high levels of methyl iodide will reach the electrode compartments it is preferable to add between 0.5 to 5% by weight acetaldehyde, most preferably 2 to 3%, to prevent formation of iodine deposits.

In an embodiment of the process, it is preferable to dilute the liquid medium prior to it entering the electrodialysis cell. This ensures that the tar does not separate from the liquid medium inside the electrodialysis thereby fouling the membranes. Preferred solvents include methyl acetate, acetic acid and acetic anhydride.

FIG. 1 further illustrates an electrodialysis cell being used to separate a typical rhodium catalyst/promoter/-copromoter mixture from a liquid medium comprising tar, carbonylation products and reactants as might be obtained by withdrawing a side stream or liquid bleed from a carbonylation reactor. In this example the rhodium is present as the anion $Rh(CO)_2I_2^-$ and the promoter and copromoters comprise additional iodide ion, the cationic form of a metal (e.g. lithium, chromium, iron etc) and a quaternised amine cation. The liquid medium and solvent are each divided into a number of streams each of which pass into alternate compartments. Under the influence of an electrical potential across the cell the anions in the liquid medium (i.e. $Rh(CO)_2I_2^-$ and $I^-$) migrate from the tar towards the anode. In doing so the anions pass through the appropriate anion permeable membrane into the adjacent compartment containing the solvent. Further migration towards the anode however is prevented because the next membrane is only cation permeable. The anions therefore become trapped in the solvent compartment and are eventually removed in the solvent through the outlet.

The cations present in the liquid medium (i.e $M^{n+}$ and $QAS^+$) undergo a similar migration except that they migrate towards the cathode through the appropriate cation permeable membrane into the adjacent compartment containing the solvent. Further progress of the cations towards the cathode is likewise prevented by an anion permeable membrane and again the cations are removed in the solvent through the outlet.

The outlet streams from the solvent containing compartments are usually combined and either recycled or further processed. The outlet steams from the liquid medium containing compartments, which now no longer contain any ions are likewise combined and processed further if necessary.

Figure 2:
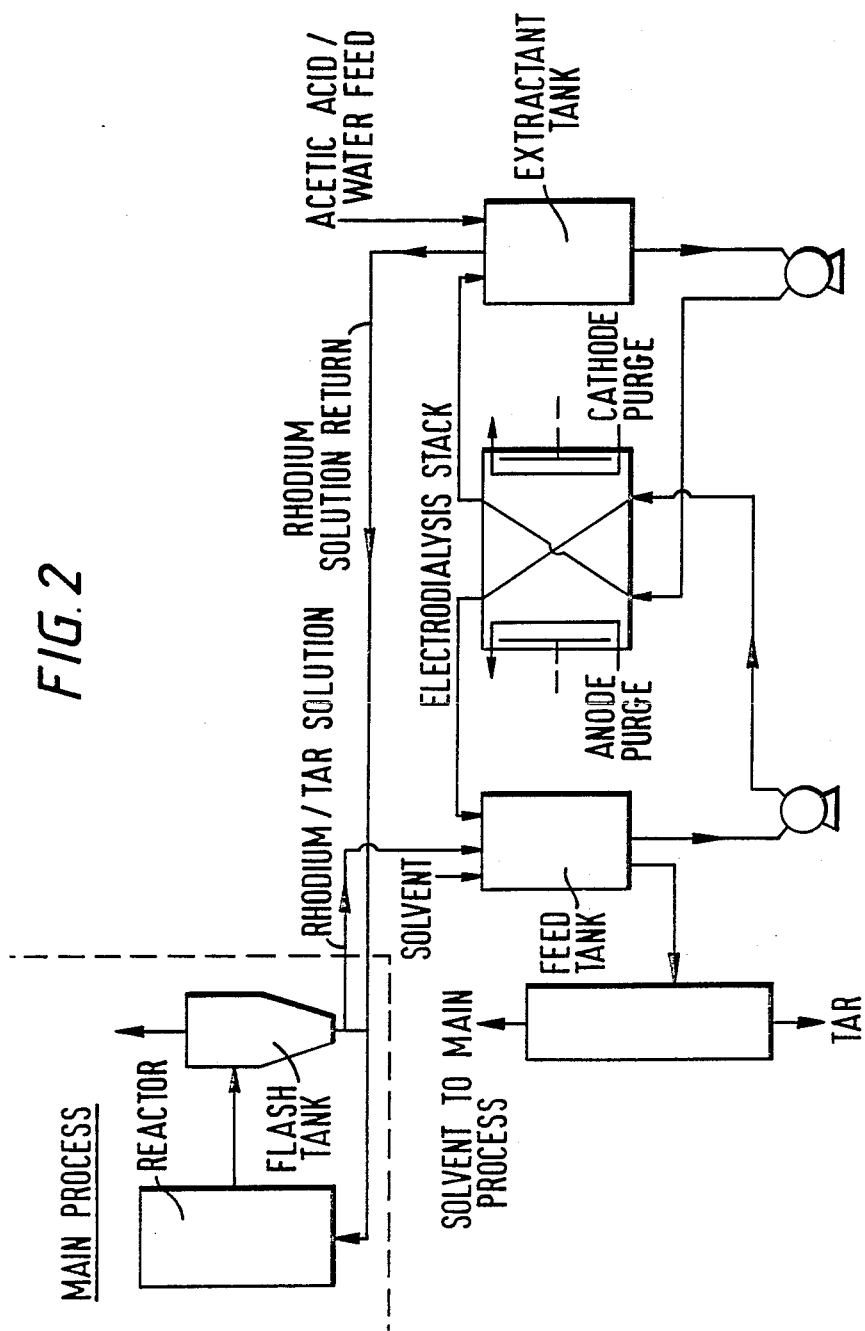
FIG. 2 is a flow diagram illustrating the present process.

The feeds to the compartments shown in FIG. 1 are in parallel for the sake of simplicity. It may be preferable to arrange that liquids flow in series through the compartments to maximise the concentration gradient and to increase the turbulence at the membrane surface to overcome mass-transport effects. Alternatively the liquid medium can be treated batchwise, each batch being recirculated through the electrodialysis cell as many times as necessary. A flow diagram for a unit used to recover rhodium is shown in FIG. 2.

Since it is the physical and chemical properties of the membranes which control the efficiency of the electrodialysis cell it is important that the membranes are selected carefully. Thus the membranes must have high mechanical strength and must be resistant to chemical attack. If possible the membrane should be resistant to clogging by the tar as this can impair the efficiency of ion transfer and should prevent excessive passage of the solvent or liquid medium between adjacent compartments.

Typically the membranes comprise a membrane polymer which can be made of one or more perfluoropolymers or copolymers of styrene and divinylbenzene. Generally such membrane polymers lack substantial mechanical strength and hence it is preferable to mount the membrane polymer, during the polymerisation, onto a reinforcing backbone such as polyethylene or polypropylene mesh.

Membranes of the type described above can be chemically modified in order to improve the selectivity to either anion or cation permeability. For example in order to improve cation permeability the membrane polymer can be sulphonated, whilst substitution with quaternary ammonium moieties leads to improved anion permeability.

Although, in principle, the electrodialysis cell can be of any size, in practice the dimensions are limited by the mechanical strength of the membranes. Typically the membranes used are 0.5 to 2 $m^2$ in area and as thin as possible to reduce electrical resistance. The membranes are typically spaced to produce compartments 0.1 to 2 mm wide to create turbulent conditions which reduce the susceptibility to mass transfer effects. Typically each electrodialysis cell comprises stacks of up to 900 membrane pairs between each pair of electrodes.

The efficiency of extraction which the electrodialysis cell achieves is determined by the number of compartments in the cell and the mobilities of the ions to be extracted. The ionic mobilities can be improved by operating the electrodialysis cell at an elevated temperature e.g. up to 100° C. Typical operating temperatures are on the range 10° to 80° C. with 15° to 40° C. being preferred.

The electrodialysis cell described above can be operated singly or in series or parallel with other similar cells.

The following examples illustrate the use of an electrodialysis cell in recovering a rhodium catalyst from a side stream which is typically obtained from a carbonylation process.

EXAMPLES 1-3

Figure 3:
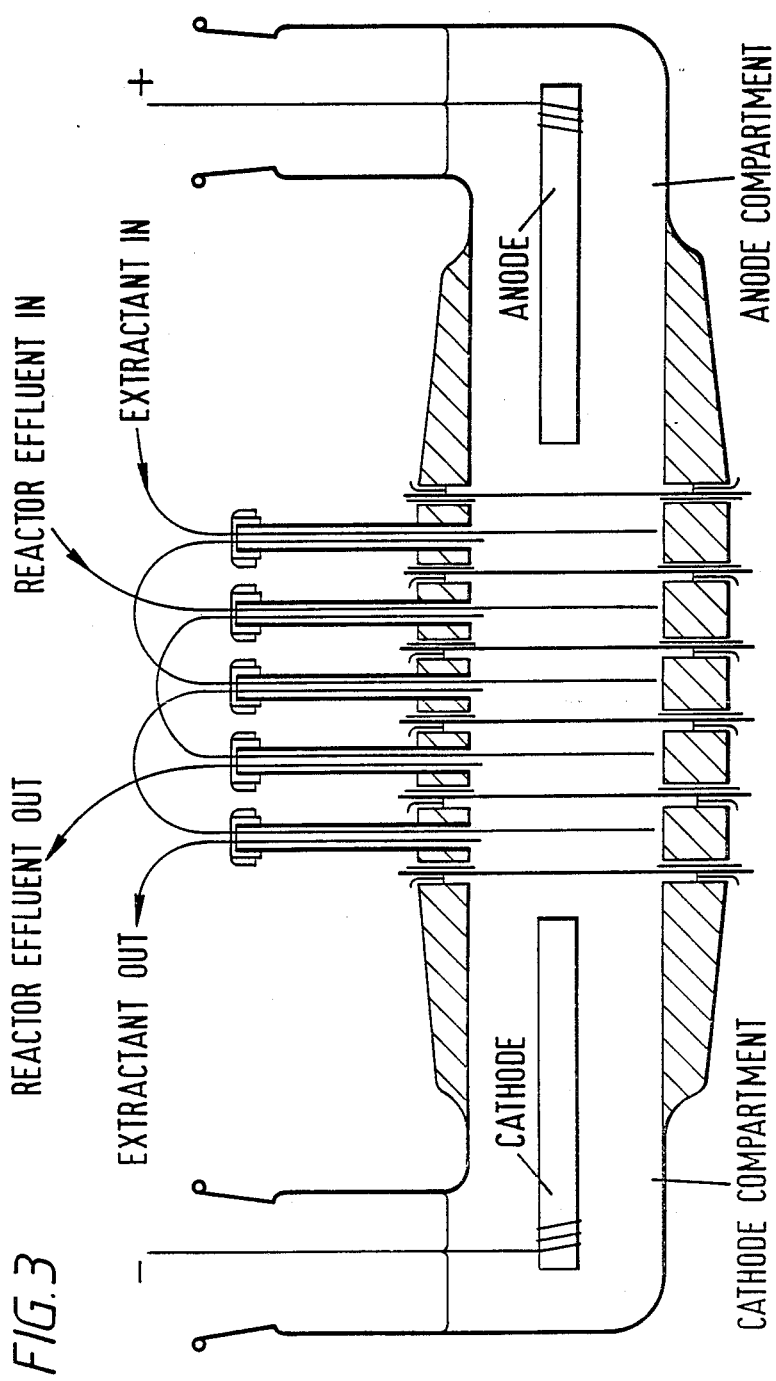
FIG. 3 is a seven compartment flow cell.

Solutions containing rhodium species and a quaternary ammonium iodide salt in a mixture blended to resemble a typical carbonylation effluent stream were dialysed by recycling batches of electrolytes through a seven compartment flow cell of the type shown in FIG. 3. The cell had a surface area of 10 $cm^2$ of active membrane pair area and was operated at a current density of 1-10 $mAcm^{-2}$. The membranes used were functionalised, cross-linked polystyrene as supplied by BDH. The electrode compartments contained carbon rod electrodes. The following electrolytes were used:

Anode Compartment:
1.5N-methylimidazole in 50/50 $H_2O$/acetic acid.
Cathode Compartment:
0.8M NN'dimethylimidazolium iodide (QAS) in 50/50 $H_2O$/acetic acid.
Extractant:
0.05M QAS in 50/50 $H_2O$/acetic acid.

The results of three consecutive experiments using the same membranes are given in the Table. Examples 1 and 2 used a solution consisting of:

| | |
|---|---|
| Acetic acid | 34 $cm^3$ |
| Methyl acetate | 3.3 $cm^3$ |
| Methyl iodide | 6.7 $cm^3$ |
| Ethylidene diacetate | 1.2 $cm^3$ |
| N—methylimidazole | 4.5 $cm^3$ |
| $[Rh(CO)_2Cl]_2$ | 0.090 g | as a synthetic reactor effluent stream. Example 3 used a hydrolysed reactor effluent such as might be obtained from a process producing acetic acid/anhydride mixtures by carbonylation and had the following composition.

| | |
|---|---|
| Acetic acid | 49.40 |
| QAS | 17.36 |
| Methyl iodide | 12.51 |
| Water | 11.42 |
| Methyl acetate | 6.98 |
| Tar | 1.07 |
| Ethylidene diacetate | 0.71 |
| Acetone | 0.41 |
| Methylethyl ketone | 0.07 |
| Propionic acid | 0.07 |
| Rhodium | 300 ppm |

The rhodium containing solutions were kept under carbon monoxide to prevent rhodium precipitation.

Analysis of the dialysates from the third experiment showed that 85% of the tar had been retained by the membranes in the effluent compartments.

Analysis of the membranes showed a rhodium concentration of 6.8 g $m^{-2}$ in the anion exchange membrane and 0.61 g $m^{-2}$ in the cation exchange membrane. This accounts for the less than quantitative rhodium recoveries in the first two experiments and the excess recovery in the third experiment.

TABLE

| Expt 1: Charge passed = 4704C | | | | | | |
|---|---|---|---|---|---|---|
| Compartment | Weight in/g | Weight out/g | Rh initial/ ppm | Rh final/ ppm | % of Rh present initial | final |
| Anode | 52.8 | 42.72 | 0 | 0.5 | 0 | 0.05 |
| Cathode | 49.5 | 42.38 | 0 | 0.6 | 0 | 0.06 |
| Reactor Effluent | 58.1 | 10.63 | 685 | 2.7 | 100 | 0.07 |
| Extractant | 105 | 133.7 | 0 | 232 | 0 | 77.9 |

| Expt 2: Charge passed = 5392C | | | | | | |
|---|---|---|---|---|---|---|
| Compartment | Weight in/g | Weight out/g | Rh initial/ ppm | Rh final/ /ppm | % of Rh present inital | final |
| Anode | 51.5 | 43.25 | 0 | 0.5 | 0 | 0.05 |
| Cathode | 51.0 | 43.54 | 0 | 0.1 | 0 | 0.01 |
| Reactor Effluent | 53.5 | 17.62 | 816 | 1.7 | 100 | 0.07 |
| Extractant | 105 | 124.1 | 0 | 289 | 0 | 82.1 |

| Expt 3: Charge passed = 6000 C | | | | | | |
|---|---|---|---|---|---|---|
| Compartment | Weight in/g | Weight out/g | Rh initial/ ppm | Rh final/ ppm | % of Rh present inital | final |
| Anode | 49.3 | 33.97 | 0 | 0.1 | 0 | 0.016 |
| Cathode | 50.8 | 26.54 | 0 | 0.1 | 0 | 0.012 |
| Reactor Effluent | 71.21 | 8.58 | 300 | 5.6 | 100 | 0.22 |
| Extractant | 104 | 160.8 | 0 | 164 | 0 | 123 |

I claim:

1. A process for recovering a Group VIII noble metal employed to catalyze a carbonylation reaction, said process comprising the steps of:

providing a liquid medium comprising the Group VIII noble metal and tar, said tar having been formed as a by-product during the carbonylation reaction;

feeding said liquid medium to a first compartment of an electrodialysis cell;

feeding a solvent for at least said Group VIII noble metal to second compartments of said electrodialysis cell adjacent either side of said first compartment;

applying a voltage across the electrodialysis cell to cause migration of the Group VIII noble metal in ionic form from said liquid medium into said solvent; and removing said solvent and the Group VIII noble metal in ionic form from said second compartments.

2. A process as claimed in claim 1 wherein said solvent is aqueous acetic acid.

3. A process a claimed in claim 2 wherein said aqueous acetic acid is one having a molar ratio of water to acetic acid in the range of 3:1 to 1:2.

4. A process as claimed in claim 1 wherein said liquid medium is diluted with a diluent selected from the group consisting of acetic acid, methyl acetate and acetic anhydride prior to entering said first compartment.

5. A process as claimed in claim 1 wherein said electrodialysis cell is operated at a temperature in the range of 15° to 40° C.

6. A process as claimed in claim 1 wherein said first and second compartments each have a width in the range of 0.5 to 2 mm.

7. A process according to claim 1 wherein any promoters and copromoters employed in the carbonylation reaction are also recovered.

8. A process according to claim 1 wherein said carbonylation reaction is a carbonylation of methanol to produce acetic acid.

9. A process according to claim 1 wherein said carbonylation reaction is a carbonylation of methyl acetate in the presence of hydrogen to produce ethylidene acetate.

10. A process as claimed in claim 9 wherein the anode and cathode of said electrodialysis cell are located in electrode compartments adjacent a compartment containing either liquid medium or solvent.

11. A process for recovering rhodium employed to catalyze a carbonylation of methyl acetate to produce acetic anhydride, said process comprising the steps of:

providing a liquid medium comprising rhodium and tar, said tar having been formed as a by-product during the rhodium catalyzed carbonylation;

feeding said liquid medium to a first compartment of an electrodialysis cell;

feeding a solvent for at least the rhodium to second compartments of said electrodialysis cell adjacent either side of said first compartment;

applying a voltage across said electrodialysis cell to cause migration of rhodium ions from said liquid medium into said solvent; and removing said solvent and the rhodium ions from said second compartments.

12. A process as claimed in claim 11 wherein said electrode compartments are purged with a purging electrolyte containing 2 to 3% by weight of acetaldehyde.

* * * * *